United States Patent
Krishnamurthy

(10) Patent No.: US 8,839,454 B2
(45) Date of Patent: Sep. 16, 2014

(54) MULTI-DIMENSIONAL USER-SPECIFIED EXTENSIBLE NARROWCASTING SYSTEM

(75) Inventor: Balachander Krishnamurthy, New York, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 278 days.

(21) Appl. No.: 12/947,447

(22) Filed: Nov. 16, 2010

(65) Prior Publication Data

US 2012/0124672 A1  May 17, 2012

(51) Int. Cl.
*G06F 7/04* (2006.01)
*G06F 12/14* (2006.01)
*H04L 29/06* (2006.01)
*H04N 7/16* (2011.01)

(52) U.S. Cl.
USPC ............... 726/27; 705/14.49; 726/3; 726/17

(58) Field of Classification Search
None
See application file for complete search history.

(56) References Cited

U.S. PATENT DOCUMENTS

| | | | |
|---|---|---|---|
| 6,327,574 B1 | 12/2001 | Kramer et al. | |
| 6,594,498 B1* | 7/2003 | McKenna et al. | 455/517 |
| 6,647,257 B2* | 11/2003 | Owensby | 455/414.1 |
| 7,072,886 B2 | 7/2006 | Salmenkaita et al. | |
| 7,305,432 B2 | 12/2007 | Feng et al. | |
| 7,552,862 B2 | 6/2009 | Flake et al. | |
| 7,689,682 B1 | 3/2010 | Eldering et al. | |
| 2003/0028621 A1 | 2/2003 | Furlong et al. | |
| 2005/0188220 A1 | 8/2005 | Nilsson et al. | |
| 2006/0165100 A1 | 7/2006 | Huang et al. | |
| 2007/0088801 A1* | 4/2007 | Levkovitz et al. | 709/217 |
| 2008/0033806 A1* | 2/2008 | Howe et al. | 705/14 |
| 2008/0040219 A1* | 2/2008 | Kim et al. | 705/14 |
| 2008/0109242 A1* | 5/2008 | Shear et al. | 705/1 |
| 2008/0262925 A1* | 10/2008 | Kim et al. | 705/14 |

OTHER PUBLICATIONS

Krishnamurthy, Balachander, "I know what you will do next summer", ACM SIGCOMM Computer Communication Review, vol. 40, No. 5 (Oct. 2010); http://www2.research.att.com/~bala/papers/pmob.pdf.

Nagaraja, Shishir,"Privacy amplification with social networks", University of Cambridge Computer Laboratory (2007); http://citeseerx.ist.psu.edu/viewdoc/summary?doi=10.1.1.97.402.

Church, Luke et al., "Privacy Stories: Confidence in Privacy Behaviors through End User Programming",University of Cambridge Computer Laboratory (2009); http://www.cl.cam.ac.uk/~jcb82/doc/2009-SOUPS-privacy-stories.pdf.

(Continued)

*Primary Examiner* — Fatoumata Traore
(74) *Attorney, Agent, or Firm* — Wolff & Samson, PC

(57) ABSTRACT

Narrowcast communication to one or more narrowcast communication recipients is provided through the use of an extensible method and apparatus. A narrowcast communication sender determines a set of attributes that define who will be eligible to receive a narrowcast communication. The set of attributes characterize potential recipients according to qualities such as interests, location, or another descriptor of a potential narrowcast communication recipient. Through the use of a privacy sphere, attributes associated with the narrowcast communication are matched to the qualities of potential recipients to identify the network addresses of the narrowcast communication recipients. The narrowcast communication is then transmitted to those network addresses. The narrowcast communication can be then expired from recipients who are no longer eligible to receive it and transmitted to recipients who become eligible to receive the narrowcast communication.

10 Claims, 10 Drawing Sheets

(56) References Cited

OTHER PUBLICATIONS

Onwuasoanya, Anthony et al., "Enhancing Privacy on Social Networks by Segregating Different Social Spheres", Governor's School of Engineering and Technology Research Journal, Final Paper/Presentation Slides (2008); http://www.osd.rutgers.edu/gs/08papers/Paper08-Facebook.pdf.

Anwar, Mohd et al., "Visualizing Privacy Implications of Access Control Policies in Social Network Systems", University of Calgary Department of Computer Science; http://www.dspace.ucalgary.ca/bitstream/1880/47220/1/2009-927-06.pdf.

Preibusch, Soren et al., "Privacy-Preserving Friendship Relations for Mobile Social Networking",W3C Workshop on the Future of Social Networking—Position Paper (Sep. 2008); http://www.w3.org/2008/09/msnws/papers/Preibusch-Beresford Privacy-Preserving-Friendship-Relations.pdf.

Dwyer, Catherine et al., "Trust and privacy concern within social networking sites: A comparison of Facebook and MySpace", Proceedings of the Thirtieth Americas Conference on Information Systems, Keystone, CO (Aug. 9-12, 2007); http://csis.pace.edu/~dwyer/research/DwyerAMCIS2007.pdf.

Davidrip, "Privacy Risks for Users of Social Network Sites", blog: Privacy in Social Network Sites (Sep. 25, 2008); http://privacyinsocialnetworksites.wordpress.com.

Utz, Sonja et al., "The privacy paradox on social network sites revisited: The role of individual characteristics and group norms", Cyberpsychology, Journal of Psychosocial Research on Cyberspace, vol. 3, No. 2 (2009); http://www.cyberpsychology.eu/view.php?cisloclanku=2009111001&articles=2.

Helft, Miguel et al., "Facebook Unveils a Service to Announce Where Users Are",New York Times, Aug. 18, 2010; http://www.nytimes.com/2010/08/19/technology/19facebook.html? r=l&src=tptw.

Sacco, Al, "5 Tips to Retain Privacy on Foursquare", PCWORLD, Aug. 29, 2010; http://www.pcworld.com/printable/article/id.204099/printable.html.

\* cited by examiner

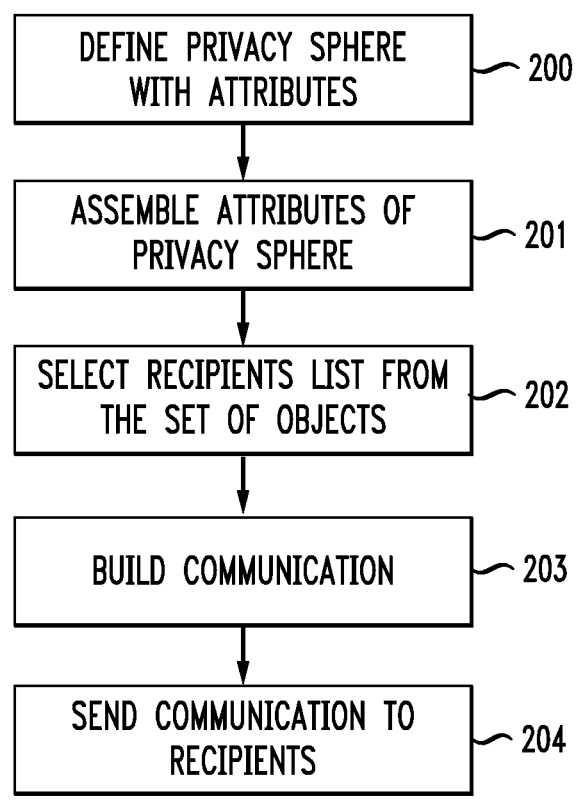

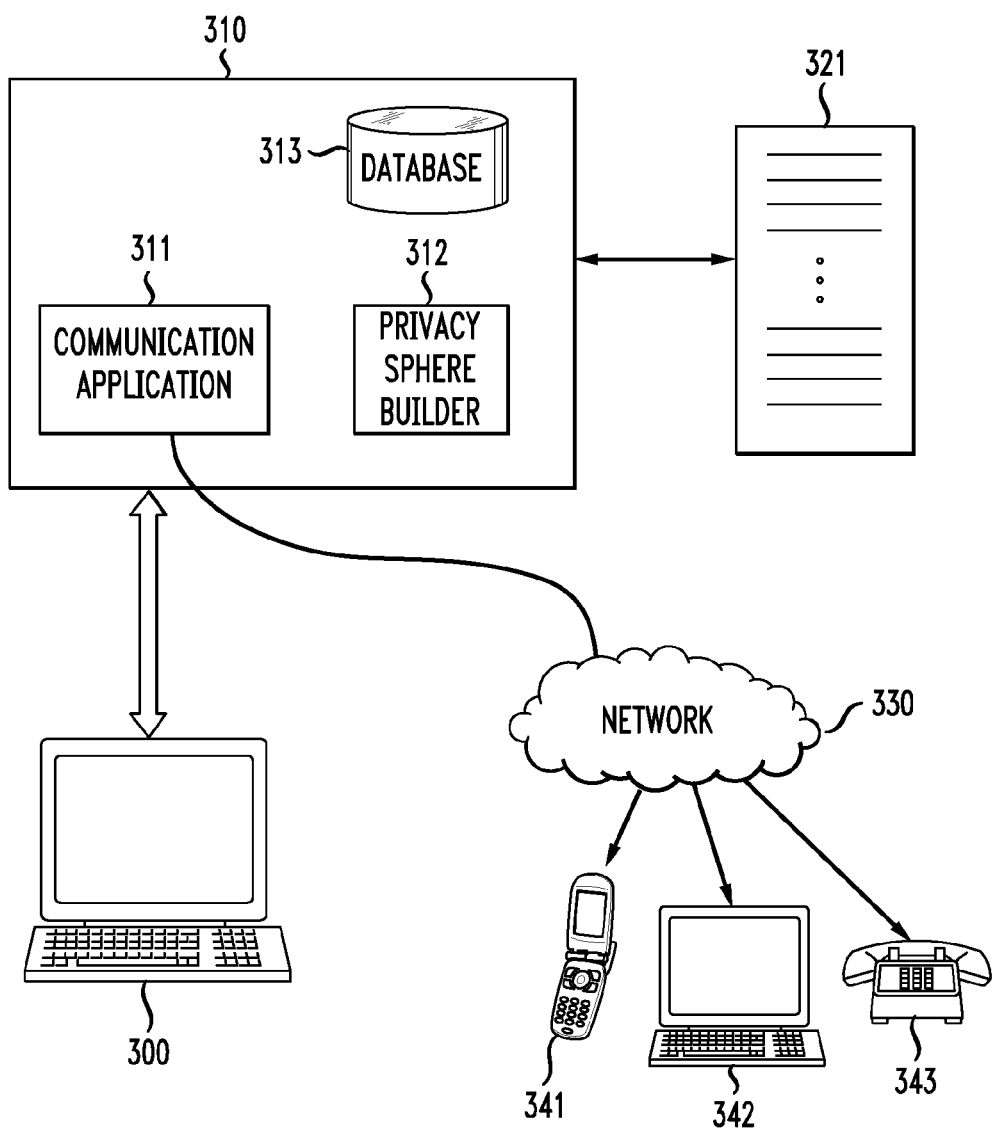

MULTI-DIMENSIONAL USER-SPECIFIED EXTENSIBLE NARROWCASTING SYSTEM

FIELD OF THE DISCLOSURE

This disclosure relates generally to privacy protection of electronic communications.

BACKGROUND

The disclosed technology relates generally to online privacy and particularly to restricting access to online communications by creating narrowcasting electronic communications.

As information sharing tools such as email and online social networks (OSNs) become have become increasingly popular, they have begun to more closely reflect people's offline lives. As these tools expand their functionality and take advantage of device mobility and location-based services (LBS), the issue of online privacy has become more important. In particular, privacy concerns are of growing importance as the uncontrolled use of users' personal information can subject the users to unwanted consequences, ranging from nuisance e-mail to fraud.

In response to the increasing need for users to limit access to their information, online communication and online social networking sites have expanded their privacy provisions to allow users to restrict access to their communications. These expanded privacy provisions have included allowing users to create personalized "friends lists". When a user specifies that a message or a posting will only be made available to a certain friends list, only those individuals whose names are included on the friends list will receive the message. This is distinct from the model of public posting on the web where information on a public web site is available to anyone on the network.

BRIEF SUMMARY

The present disclosure provides an extensible and granular method and system for narrowcasting communication to a plurality of recipients.

Narrowcasting is an expansion of the idea of creating explicit lists of friends and making communications available to anyone on that list. Narrowcasting refers to dissemination of information to a restricted (or narrow) audience, as opposed to broadcasting which involves the sharing of information with the general public. In particular, narrowcasting refers to selecting an audience for a communication not through an explicit listing of addresses, but by making the communication available to receivers who share a particular quality, such as a common interest or membership in a group.

In accordance with an embodiment of the present disclosure, a narrowcast communication sender determines a set of attributes that define who will be eligible to receive a narrowcast communication. The set of attributes are a set of requirements that potential recipients have to meet in order to receive the narrowcast communication. A privacy sphere is a device used to identify the recipients of a narrowcast communication. A privacy sphere may include a set of sender defined attributes, a pointer to a source of potential recipients and code that allows the privacy sphere to determine whether a potential recipient meets the requirements to receive the narrowcast communication.

The rules that make up the privacy sphere are based on the set of attributes determined by the message sender. The privacy sphere is used to select prospective recipients of the message by comparing the set of the attributes determined by the message sender with the meta-data of prospective recipients. In accordance with the present disclosure, the network address and meta-data of a potential recipient of a narrowcast communication are stored in an object that corresponds to the potential recipient. The meta-data, if present, for each object may be used by the privacy sphere to match the attributes specified by the message sender. In accordance with the present disclosure, the objects that correspond to potential narrowcast communication recipients are referred to as a set of objects.

Each object in the set of objects may include meta-data and a network address for a potential narrowcast communication recipient. The meta-data may include, for example, location information, interests, and other characteristics that may be useful in determining whether a communication should be sent to the potential recipient. The system may compare the attributes of the privacy sphere and an object in the set to see if the meta-data of the object meets the requirements of the privacy sphere. Objects whose meta-data is matched to the attributes of the privacy sphere may be selected for inclusion in a recipient list.

When the system determines that there is at least one recipient eligible to receive the narrowcast communication it generates a narrowcast communication recipient list. Having created the narrowcast communication recipient list, the system generates the narrowcast communication to be transmitted to the recipients on the narrowcast communication recipient list. The narrowcast communication includes at least the communication payload, which contains the message itself. In some embodiments the narrowcast communication includes a representation of the privacy sphere in the form of a set of narrowcast attributes. The narrowcast attributes may include the attributes of the privacy sphere that was originally associated with the message. If, after receiving the message, the meta-data of the recipient no longer matches the attributes of a message recipient, the system can expire the communication or in some embodiments the message can expire itself.

In some embodiments of the present disclosure, the recipients of the narrowcast communication as defined by the privacy sphere can change over time in these embodiments the narrowcast communication may be made available to some recipients at a time after the narrowcast communication was initially transmitted. In some embodiments of the present disclosure where the recipients of the narrowcast communication change over time, the narrowcast that was transmitted to certain narrowcast communication recipients may expire. In some embodiments of the present disclosure the narrowcast communication may be created with a defined information lifetime. If the sender specifies an information lifetime for the narrowcast communication the communication will expire after a specified narrowcast communication lifetime passes.

In an embodiment, the disclosed system may include a non-transitory computer readable medium encoded with computer executable instructions for transmitting a narrowcast communication. When a computer system executes the instructions the computer is capable of performing a series of actions. The computer system can receive a privacy sphere that includes at least one attribute used to define the recipients of the narrowcast communication. The computer system can compare an attribute included in the privacy sphere to a set of objects. The objects accessed by the system may include network addresses and associated meta-data. The computer system can assemble a recipient list based on the comparison of the privacy sphere and the set of objects. The computer system can also define a message restriction by processing the privacy sphere and deriving attributes that are suitable to accompany the narrowcast communication so that the system may determine if a narrowcast communication recipient is still eligible to receive the narrowcast communication at a later time.

In some embodiments, senders can develop their own attributes to describe the characteristics of potential message recipients. In some embodiments, a user can create their own privacy sphere and share it with others in order to allow other senders to benefit from the combination of restrictions that the user has created.

These and other advantages of the invention will be apparent to those of ordinary skill in the art by reference to the following detailed description and the accompanying drawings.

BRIEF DESCRIPTION OF THE DRAWINGS

FIG. 2 is a flowchart of a method for preparing and sending a narrowcast communication according to an embodiment of the present disclosure.

FIG. 3 illustrates a system that can implement the method according to an embodiment of the present disclosure.

DETAILED DESCRIPTION

The present disclosure relates to a method and system for a narrowcast communication sender to transmit a communication to a group of people who meet specific characteristics without having to explicitly name a list of recipients. The communications transmitted according to the present disclosure are referred to as narrowcast communications. Narrowcast communications are communications that are transmitted to a limited audience, as opposed to broadcasting which involves the sharing of information with the general public. In particular, narrowcast communications are distinctive in that the recipients of a narrowcast communication are not solely defined in terms of a list of addresses, but the selection of recipients is made at least partly on a particular aspect or interest of the prospective recipients. For example, the recipients of a narrowcast communication may be specified by attributes such as, "people in my address book whose home address is in New Jersey and are interested in automobiles".

Figure 1:
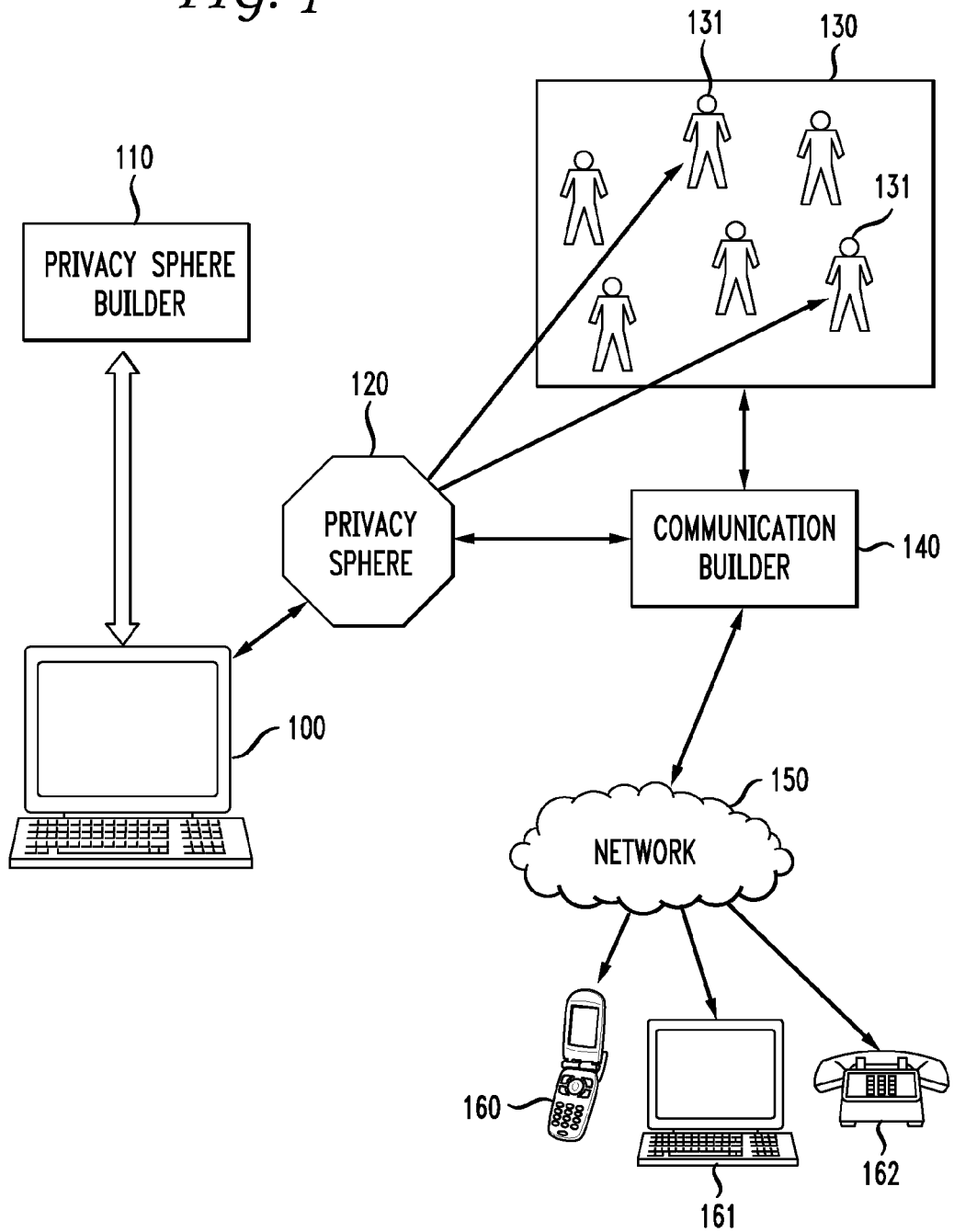
FIG. 1 illustrates a narrowcast communication system providing network-based narrowcast communications according to an embodiment of the present disclosure.

According to various embodiments of the present disclosure, a sender defines a privacy sphere for a message. The privacy sphere includes a set of attributes or requirements that receivers must have to be included in the group of recipients of the communication. FIG. 1 illustrates a narrowcast communication system according to an embodiment of the present disclosure. The user of the system prepares a narrowcast by interacting with a privacy sphere builder application 110. The privacy sphere builder 110 is represented in FIG. 1 as separate from the user's computer 100. In this case, the privacy sphere builder 110 may run remotely from the computer 100 and may be accessed by the computer 100, for example, via a network. In accordance with certain embodiments of the present disclosure, the privacy sphere builder 110 may be an application that is running on the computer 100. Furthermore, while the user's computer 100 is represented by an image of a laptop computer, it should be understood that the user may generate the narrowcast communication on any device capable of interacting over a network such as a desktop computer, a mobile phone, a media player, or any other device with network connectivity.

The privacy sphere builder 110 may present on a display of the computer 100 a user with an interface that allows the user to define the elements of the privacy sphere 120. The privacy sphere builder 110 will be described in greater detail below with reference to FIG. 5. In an embodiment, a user wishing to build a privacy sphere 120 will take several actions in selecting inputs for the privacy sphere builder 110. These actions may include: selecting a set of attributes that correspond to the restrictions the user would like to place on the narrowcast communication and selecting a reference to a set of objects 130 to be used as a source of potential narrowcast communication recipients. In some embodiments, the inputs to the privacy sphere builder 110 may be created as a text file on the computer 100 and loaded into the privacy sphere builder 110. In some embodiments, the attributes for the narrowcast communication can be implemented as an XML file.

In some embodiments the attributes of the narrowcast communication can be implemented as name-value pairs. An exemplary, but not exhaustive set of name-value pairs are listed in Table 1. Table 1 shows several specific examples of types of attributes that can be used in defining a privacy sphere for a narrowcast communication. It should be noted that a user of the system as described in the present disclosure is free to generate their own values and types of attributes. One skilled in the art will understand that there are a variety of technologies that can be used to store the name-value pairs. For example a text file may be used but various other technologies including databases, encoded strings and XML files would also be appropriate choices.

The privacy sphere builder 110 accepts the attributes and a reference to the set of objects 130 and assembles a privacy sphere 120. In an embodiment, a privacy sphere 120 includes a set of rules that define the set of recipients of the narrowcast communication and a reference to a set of objects 130 that corresponds to the potential recipients of the narrowcast communication. The set of objects 130 is discussed in more detail below. The rules that are included in the privacy sphere are made up of the attributes selected by the narrowcast communication sender. An example of a privacy sphere 120 would be a reference to a set of objects 130 such as a "friends list" and a list of attributes for the narrowcast communication recipients 160 such as a requirement that the recipients be fans of the NY Giants football team.

In addition to the set of rules that make up a privacy sphere 120, the privacy sphere also includes a mechanism for comparing those rules to objects from the set of objects 130 to determine if an object from the set of objects 130 falls within the privacy sphere 120. In an embodiment where the privacy sphere 120 includes a rule that the recipient of the narrowcast communication must be within a certain distance of the location of the narrowcast communication sender at the time that the narrowcast communication is sent, the privacy sphere includes code that when executed can make a comparison of the location information of the sender of the narrowcast communication and the location information of the potential recipients. This code uses the location (when known) of the potential recipient of the narrowcast communication to determine if a potential recipient is currently within that geographic distance of the sender of the narrowcast communication. It should be noted that in some embodiments the privacy sphere may be configured to ignore attributes that correspond to location or other meta-data when an object does not have a value for the corresponding meta-data.

Table 1 illustrates several examples of attributes that can be combined to generate the rules component of a privacy sphere 120 for a narrowcast communication. The examples presented in Table 1 are included only for purposes of clarifying the types of attributes that may be used in generating a privacy sphere 120 and should not be construed to limit the present disclosure. Table 1 shows examples of four types of attributes that a narrowcast communication sender may chose in defining the privacy sphere 120 for a message. For example, a sender may decide that a narrowcast communication should only be sent to those contacts in the sender's address book that are located within a half mile of the sender's current location. In another example, a sender may wish to transmit his narrowcast communication according to an interest attribute, for example, a sender may wish to transmit his narrowcast communication to addresses associated with his friends who are interested in Chinese food. In another example, a sender may wish to limit how long the narrowcast communication will be available to its recipients by assigning an attribute that the narrowcast communication will have an information lifetime such as 45 minutes. It should be evident that there are numerous possible attributes that a sender may use to define a privacy sphere 120 for a narrowcast communication. Moreover, attributes can be combined into compound attribute types such as, "friends who are interested in fine dining and interested in Chinese food."

TABLE 1

An exemplary list of some attribute types and values that may be used in a defining a privacy sphere for a narrowcast communication.

| Attribute Type | Attribute |
| --- | --- |
| Geographic | Recipients located within half a mile of the sender's location. |
| Interest | Recipients are interested in Chinese food. |
| Temporal | The lifetime of this message is 45 minutes from the time that it is sent. |
| Compound | Recipients are interested in Fine Dining AND interested in Chinese food. |

As indicated in FIG. 1, once the user has generated a privacy sphere 120, the attributes that make up the privacy sphere 120 are used to select objects from a set 130. Each object corresponds to a potential recipient of the narrowcast communication. Each object in the set of objects 130 has a network address associated with it. Some or all the objects may have associated meta-data. In some implementations the privacy sphere may be configured so that the network addresses of objects that lack meta-data that correspond to the attributes of the privacy sphere are added to the recipient list. The meta-data represent attributes associated with a potential narrowcast communication recipient who corresponds to the network address of that object. Examples of the types of meta-data that may be associated with an object are illustrated in Table 2. The examples of meta-data presented in Table 2 are included only for purposes of clarifying the types of meta-data that may be associated with an object in the set of objects 130 and should not be construed to limit the present disclosure.

In an embodiment a set of objects 130 as referred to in the present disclosure includes one or more objects. An object includes meta-data that describe potential recipients of the narrowcast communication. The meta-data for each potential recipient includes at least a network address that corresponds to that potential recipient. At least of some of the objects in the set of objects 130 include not only network addresses, but also other meta-data values associated with the potential narrowcast communication recipient. In an embodiment, the set of objects may include the network addresses from an electronic address book, where at least some of the network addresses in the set of objects have associated meta-data for example: home address information. According to some embodiments of the present disclosure, the types of meta-data that may be associated with an object in the set of objects include location information, interests, or demographic information. In some embodiments, the data in the set of objects 130 may be contained in an electronic file with a list of network addresses and meta-data associated with some of all of the listed network addresses. One skilled in the art would understand that the types and values of meta-data should not be construed to be limited by those listed in the present disclosure, but should be understood to be expandable to include values that are appropriate for a narrowcast communication sender's privacy sphere.

TABLE 2

An exemplary list of some attribute types and values that may be used in a defining a privacy sphere for a narrowcast communication.

| Object Meta-Data Type | Object Meta-Data Value |
| --- | --- |
| Geographic Meta-Data | Current Location Long.: 40° 47' 16" N<br>Current Location Lat.: 74° 23' 19" W |
| Interests Meta-Data | Likes Chinese Food, Baseball, Fine Meals |
| Compound Meta-Data | Likes Fine Hotels ONLY WHEN Location is within Europe. |

In accordance with an embodiment of the present disclosure, the set of objects can be implemented in various ways that would be clear to a person of ordinary skill in the art. Among the options for implementing the storage of the set of objects are: an email address book, an XML file, a flat text file, or a database. It is to be understood that the present disclosure is not limited to these options and various other storage formats may be used as well.

As illustrated in FIG. 1, the privacy sphere 120 compares the attributes that make up the privacy sphere 120 to the meta-data of the objects in the set of objects 130. Objects 131 whose meta-data match the attributes that make up the privacy sphere 120 are selected to be recipients 131 of the narrowcast communication 160. The network addresses associated with the selected objects 131 are added to a list of narrowcast communication recipients 160, 161, 162. Once the privacy sphere 120 has identified the network addresses that will receive the narrowcast communication 131, the communication builder 140 prepares the narrowcast communication to be transmitted to the network addresses in the list of narrowcast communication recipients 160.

As shown in FIG. 1, the communication builder 140 transmits the narrowcast communication to the narrowcast communication recipients 160, 161, 162. The transmission occurs over a network 150. In various embodiments, the network 150 could be a telephone network, the Internet or another communication network suitable for transmission of narrowcast communications. It is to be understood that the present disclosure is not limited to these options and various other storage formats may be used as well.

The rules that are used to make up the privacy sphere 120 can be related to the meta-data associated with the objects that make up the set of objects 130. In particular, the code included in the privacy sphere 120 for comparing the attributes of the privacy sphere 120 with the meta-data of the objects included in the set of objects 130 referenced by the privacy sphere 120 must be able to accept and compare the attributes included in the privacy sphere 120 and the meta-data associated with the objects in the set of objects 130. In some embodiments, the privacy sphere 120 may perform a translation of either the meta-data or the attributes or both in order to perform the comparison of the meta-data with the attributes. For example, in an embodiment of the disclosed system in which the privacy sphere 120 includes a rule that potential recipients must be within a certain city, and where the location meta-data for the objects in the set of objects 130 is provided in longitude and latitude, the privacy sphere 120 may translate the longitude and latitude of the city borders in order to determine if the longitude and latitude meta-data for an object fall within the rules of the privacy sphere 120.

FIG. 2 depicts a flowchart of a method for preparing to transmit the narrowcast communication according to an embodiment of the present disclosure. In stage 200, the privacy sphere builder defines the privacy sphere for the narrowcast in terms of a set of attributes of a potential recipient of the narrowcast communication. In stage 201 the attributes are assembled into the privacy sphere by generating code to compare the attributes to the meta-data of the set of objects. In stage 202, at least one recipient for the message is identified by comparing the attributes in the privacy sphere to the meta-data of the associated object in the set of objects. In stage 203 the communication is prepared for transmittal. In stage 204 the communication is transmitted to the narrowcast communication recipients.

FIG. 3 depicts a system for narrowcasting a communication to a set of recipients that is implemented via a server 310 according to an embodiment of the present disclosure. The components depicted in FIG. 3 function in a similar fashion to the components depicted in FIG. 1. The server 310 runs software that implements the functionality of the communication application 311, the privacy sphere builder 312, and the database 313. The server accesses the set of objects 321 either via a local disk or over a network 330. The server is in communication with the user's computing device 300 and with the communication devices of the recipients 341, 342, 343 via a network 330. While the set of objects 350 is shown in FIG. 3 as separate from the server that runs the communication application 311 and the Privacy sphere Builder 312, in some embodiments the set of objects 321 may also be maintained on the server 310. Note that FIG. 3 shows narrowcast communications being received on mobile phones 341, computers 342 and landline phones 343. As will be clear to one of ordinary skill in the art, the disclosed system may deliver messages to various devices that have the capability to receive networked communications.

In some embodiments of the present disclosure a narrowcast communication recipient may be no longer eligible to receive the narrowcast communication. In some embodiments, the narrowcast communication may have a certain information lifetime after which the narrowcast communication should be expired. In some embodiments of the present disclosure, a narrowcast communication recipient who was initially eligible to receive the narrowcast communication may undergo a change of his associated meta-data so that the recipient no longer falls within the attributes defined in the privacy sphere for the narrowcast communication. In cases in which a recipient is no longer eligible to receive a narrowcast communication the narrowcast communication may be expired. In some embodiments a narrowcast communication may expire itself by deleting itself. In some embodiments, such as embodiments in which the narrowcast communication is transmitted via a web page, the narrowcast communication may be expired by the web page associated with the narrowcast communication being taken down. Other methods of expiring a narrowcast communication may be used.

In some embodiments of the present disclosure, recipients that are associated with objects whose meta-data do not correspond to the attributes of the privacy sphere at the time that the narrowcast communication was sent may not receive the narrowcast communication. In some embodiments of the present disclosure, the privacy sphere continues to monitor the set of objects after the narrowcast communication has been sent to determine if any objects have changed state since the narrowcast communication has been sent. In some embodiments of the present disclosure, upon detection that the meta-data of an object from the set of objects has become eligible to receive the narrowcast communication, the privacy sphere will add the network address from the object to the recipients list and cause the network address associated with that object to receive the narrowcast communication.

Figure 4A:
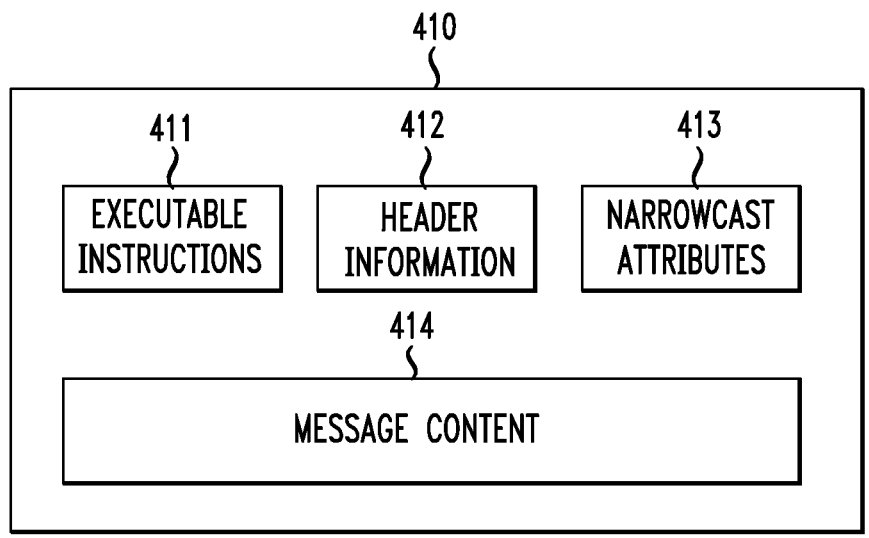
FIG. 4a and FIG. 4b are block diagrams that illustrate the components of a message prepared according to certain embodiments of the present disclosure.
Figure 4B:
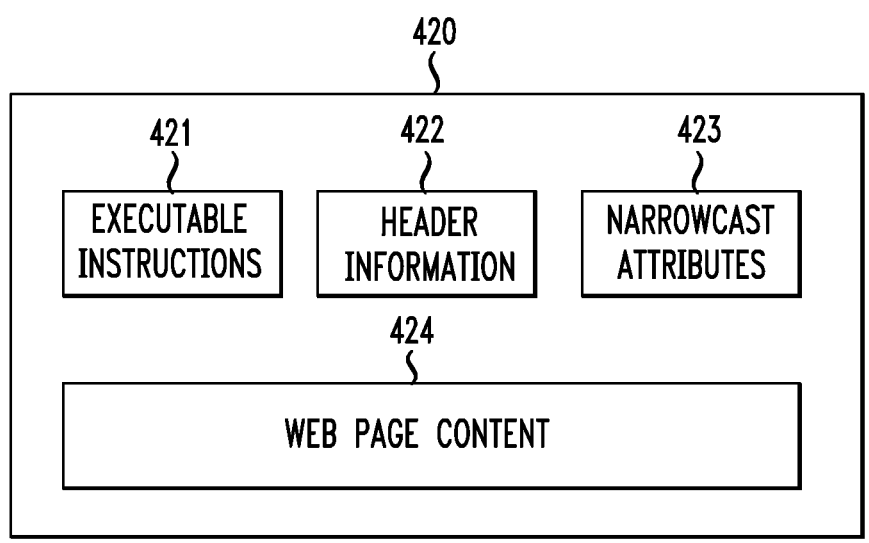

FIG. 4a and FIG. 4b show two block diagrams that indicate the structure of exemplary narrowcast communications 410 and 420 according to embodiments of the present disclosure. FIG. 4a shows the structure of a directly transmitted narrowcast communication 410 such as a narrowcast communication transmitted through an email system. The communication payload of the transmitted narrowcast communication is represented by the message content 414, which could consist of a string such as, "Meet me for lunch if you are interested". The executable instructions 411 section of the narrowcast communication contains software that allows transmitted narrowcast communication to expire the message if a specific condition defined in the narrowcast attributes 413 is met. In an embodiment a narrowcast communication 410 may have a set information lifetime (for example the set information lifetime may be thirty minutes after the narrowcast communication 410 is transmitted.) In such a case, the executable instructions 411 expire the message when the information lifetime is exceeded. The header information 412 contains information such as a timestamp of the time that the narrowcast communication was sent or other records corresponding to the narrowcast communication 412. The narrowcast attributes 413 include a record of the attributes that were included in the privacy sphere used to generate this narrowcast communication. The narrowcast attributes 413 are available to be read by the executable code 411 in order to determine if a recipient who, at the time that the message was sent qualified to receive the narrowcast communication 410, but at a later time no longer qualifies to receive the narrowcast communication 410. In the case of a recipient of a narrowcast communication who no longer qualifies to receive the narrowcast communication the executable instructions 411 will expire the narrowcast communication. It should be noted that in some embodiments the narrowcast attributes themselves are not carried with the narrowcast communication 410. In some of these embodiments the narrowcast attributes 411 may be stored at a remote location such as at a communication application that transmitted the narrowcast communication 410. In some of these embodiments, the narrowcast attribute 411 of the narrowcast communication 410 may contain a pointer to the remote location so that the narrowcast communication is able to determine whether the narrowcast communication recipient is still eligible to receive the communication by polling the communication application. Other methods for determining whether a narrowcast communication should be expired may also be used.

According to various embodiments of the disclosed system the executable instructions 411 can be implemented in various ways. For example, a prepared narrowcast communication can include an executable file that wraps the message and provides a self-destruct call that will delete the narrowcast communication in response to a signal that the narrowcast communication should expire. In some embodiments the header information of the narrowcast communication may be encrypted with a key that the narrowcast communication sender retains. In some embodiments, the header information of a narrowcast communication can be decoded to determine to which network address the narrowcast communication was originally transmitted. These embodiments may allow the narrowcast communication sender to determine the source of a copy of a narrowcast communication that is found available outside of the set of original recipients of the narrowcast communication. In some embodiments of the present disclosure the header information may be embedded in the message according to stenographic techniques.

The narrowcast communication structure and techniques discussed with regard to FIG. 4*a* have been directed to direct communications such as email, SMS, and other one-to-one communication modes. The narrowcasting system may be implemented using other communication modes such as web posting. FIG. 4*b* illustrates the structure of a narrowcast communication implemented via a web posting according to an embodiment of the present disclosure.

FIG. 4*b* illustrates a block diagram of a narrowcast communication as it would be posted on the web according to an embodiment of the present disclosure. Thus the structure illustrated in FIG. 4*b* would be appropriate for a web page communication, a pod cast or another one-to-many communication mode. Schematically the narrowcast communication is similar to the one illustrated in FIG. 4*a* with executable instructions 421, header information 422, and narrowcast attributes 423. The web page content 424 shown in FIG. 4*b* is similar to the message content 414 shown in FIG. 4*a* and could consist of a string such as, "Meet me for lunch if you are interested" posted on a web page. When the narrowcast communication 420 is transmitted via web publication (for example as the posting of information via the "writing on wall" in an online social network) the scheme for the communication itself may be similar to a direct transmission message, but the web page content 424 of the narrowcast communication 420 may be transmitted differently.

The narrowcast communication 420 maybe posted on a web site and the link to the communication is sent to the eligible recipients of the narrowcast communication. In some embodiments, the narrowcast communication may be posted at a website and eligible recipients receive a one-to-one communication such as an email containing an individualized network address where the narrowcast communication 420 can be seen. In some embodiments the narrowcast communication recipients receive the same web address for the narrowcast communication and view the message at that web address. In some embodiments of the disclosed system there is a separate web address that corresponds to each recipient of the message. In embodiments in which there is a separate web address for each recipient the web server posts individual web pages containing the narrowcast communication. The address for each individual web page is sent to an individual narrowcast communication recipient. In the event that a particular narrowcast communication recipient is no longer eligible to receive the narrowcast communication the web page for that recipient is taken down. In a similar manner as described for the one-to-one communications mode, stenographic information can be embedded in each of the individual web pages in order to allow the sender to trace back any copies to the original receiver of the narrowcast communication.

Figure 5:
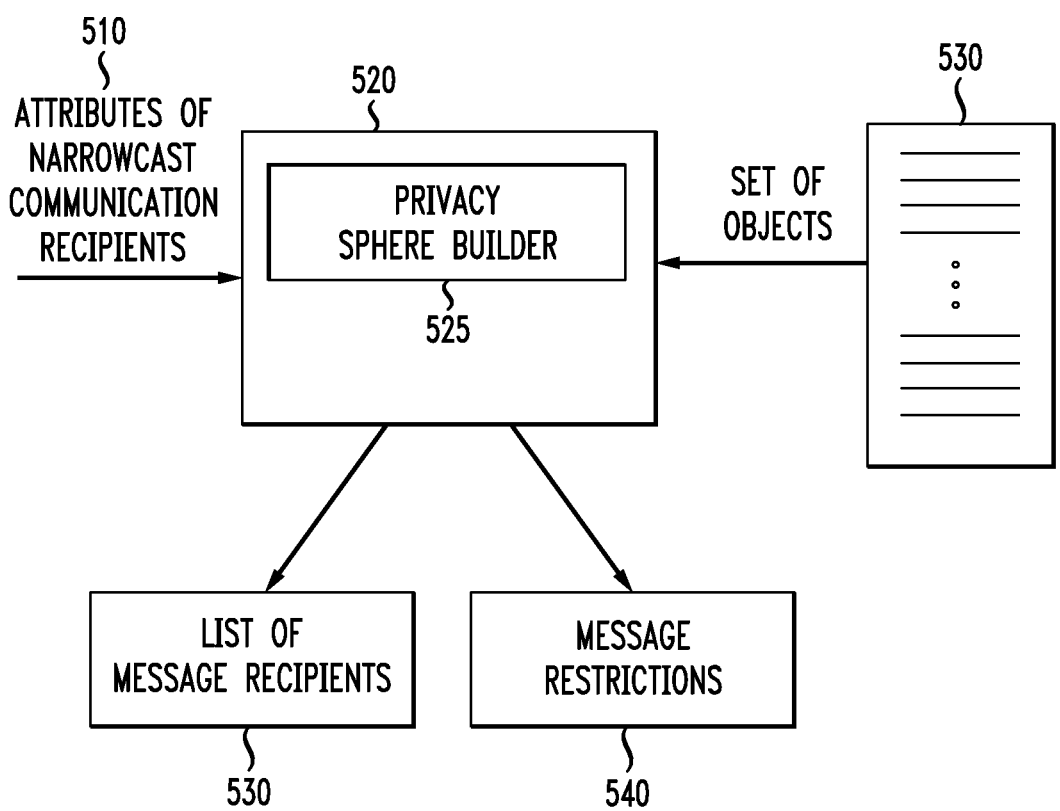
FIG. 5 illustrates a block diagram of a component of the system that implements an embodiment of the present disclosure. In particular, FIG. 5 corresponds to a privacy sphere builder that accepts narrowcast communication restrictions and assembles a privacy sphere.

FIG. 5 illustrates a block diagram of the privacy sphere builder according to an embodiment of the present disclosure. The privacy sphere builder 525 running on a server 520 receives as an input a set of one or more attributes 510 that define which potential recipients are eligible to receive the narrowcast communication. The privacy sphere builder 525 also receives a reference to a set of objects 530 that correspond to potential recipients of the narrowcast communication. The privacy sphere builder 525 assembles a set of rules that enable the privacy sphere to compare the attributes of the narrowcast communication to the meta-data associated with the objects contained within the set of objects 530. The privacy sphere builder 525 uses these rules to identify a list of narrowcast communication recipients 530 and a set of narrowcast attributes 540.

Figure 6A:
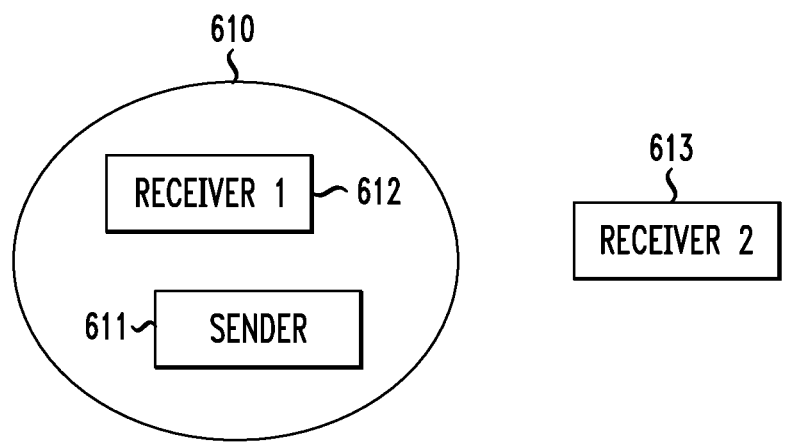
FIG. 6 illustrates an experience of narrowcast communication recipients according to certain embodiments of the present disclosure.
Figure 6B:
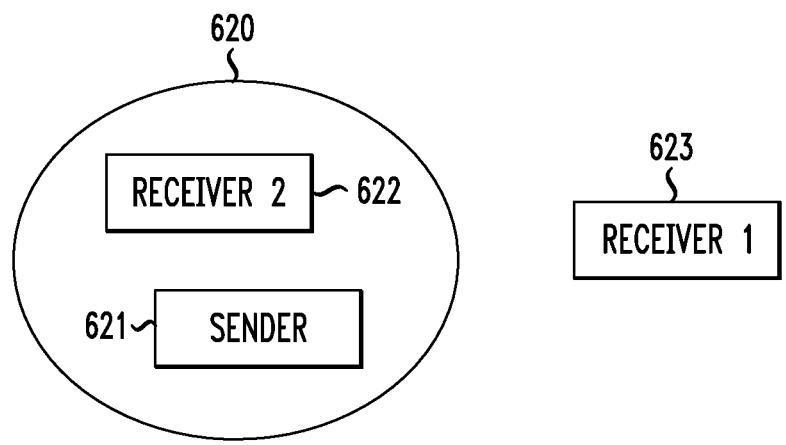

FIG. 6 illustrates an example wherein a communication recipient 612 who was initially eligible to receive the narrowcast communication becomes ineligible to receive the narrowcast communication at a later time. As illustrated in FIG. 4, the narrowcast communication can carry the narrowcast attributes 413 that were the basis for selecting a particular narrowcast recipient to receive the narrowcast communication at the time that the narrowcast communication was originally sent. The narrowcast attributes and the executable instructions determine if the recipient remains eligible to receive the narrowcast at a later time after the narrowcast communication has been received. In FIG. 6*a* the sender 611 has defined a privacy sphere that includes the attribute that the recipient must be within a certain distance of the sender. This distance is indicated by the circle 610. At the time that the message is first sent Receiver1 612 is within the radius and receives the message. At that time Receiver2 613 is not within the radius and does not receive the narrowcast communication. In FIG. 6*b* which corresponds to a time later than the time at which the narrowcast communication was transmitted, each of Receiver1 623 and Receiver2 622 have moved and the situation has reversed itself. Receiver1 623 is no longer within the radius defined in the privacy sphere, but Receiver2 622 is within the privacy sphere. In some embodiments Receiver2 622 would receive the narrowcast communication when the system became aware that the object associated with Receiver2 622 had become eligible to receive the narrowcast communication. Similarly, in some embodiments, when Receiver1 623 is no longer eligible to receive the narrowcast communication, Receiver1's 623 narrowcast communication would be expired.

Figure 7:
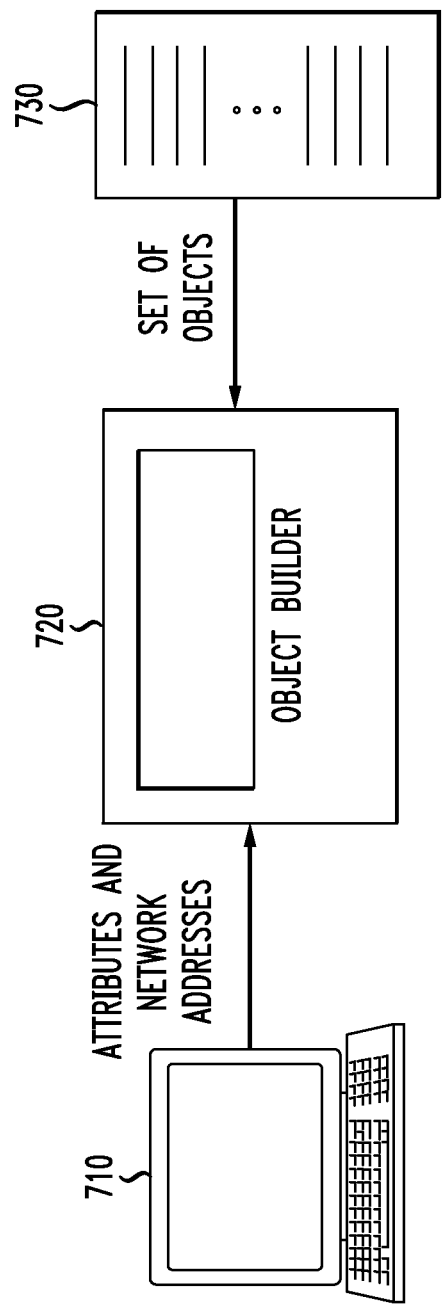
FIG. 7 illustrates a system that allows a user to assemble a set of objects according to certain embodiments of the present disclosure.

FIG. 7 illustrates an embodiment in which a user assembles a set of object for use according to the present disclosure. The user 710 interacts with the Objects Builder 720 in order to generate or edit objects within the set of objects 730. The Objects Builder 720 allows a user to add, edit or delete objects from the set of objects. According to some embodiments, editing an object in the set of object can include adding, deleting or modifying the meta-data and network address associated with an object within the set of objects 730. The set of objects 730 may include objects that have a network address and meta-data associated with the recipient available at that network address. The Set of Objects 730 may include objects whose meta-data are dynamic meta-data. The set of objects 730 may include objects whose meta-data are static meta-data. Examples of static meta-data may include for example, "likes Chinese food", "does not accept communications between December 25 and January 1", and "fan of Justin Bieber". Examples of dynamic meta-data include, "current location", "Heartrate", "Speed", "Velocity". It is to be understood that these examples are not intended to limit the present disclosure and other static and dynamic meta-data may be used as well. In some embodiments users may generate their own meta-data and share their meta-data with their fellow users.

There are a variety of techniques available to collect static meta-data. Examples of techniques available to collect static meta-data include: asking an individual associated with a network address to submit their own meta-data, collecting static meta-data over time by observing the behavior of an individual associated with a network address, and collecting static meta-data from third-party sources. It is to be understood that various other techniques may also be used to collect static meta-data as well.

There are a variety of techniques available to collect dynamic meta-data. In some embodiments an application that runs on a mobile device may be used. For example, an application can use GPS or cell-triangulation to record information relating to the mobile device's position. Similarly, heart rate and similar variables may be recorded through mobile devices that a user carries with him or her. It is to be understood that various other techniques may also be used to collect dynamic meta-data as well.

Figure 8:
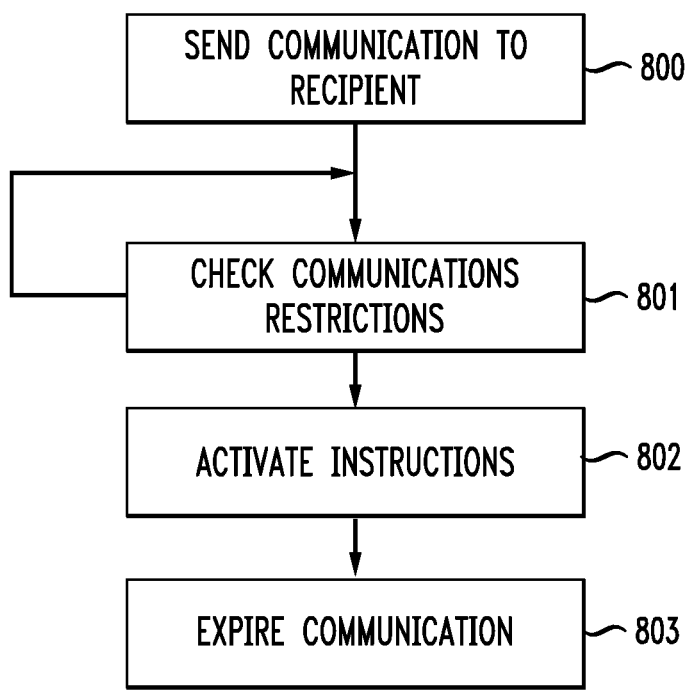
FIG. 8 illustrates a flow chart of a method described in the present disclosure. The flow chart indicates a process in which a narrowcast communication can expire after the narrowcast communication is sent to a recipient.

FIG. 8 illustrates a flowchart for expiring a narrowcast communication as a result of a recipient no longer being eligible to receive the narrowcast communication according to an embodiment of the present disclosure. In step 800, the narrowcast communication is transmitted to the recipient. In step 801, the communication checks the status of the recipient to determine if the recipient is still eligible to receive the narrowcast communication. If the recipient is still eligible to receive the narrowcast communication, step 801 is repeated until the recipient is no longer eligible. When the recipient is no longer eligible to receive the narrowcast communication, the executable instructions are activated 802. In step 803, the executable instructions cause the narrowcast communication to be expired.

Figure 9:
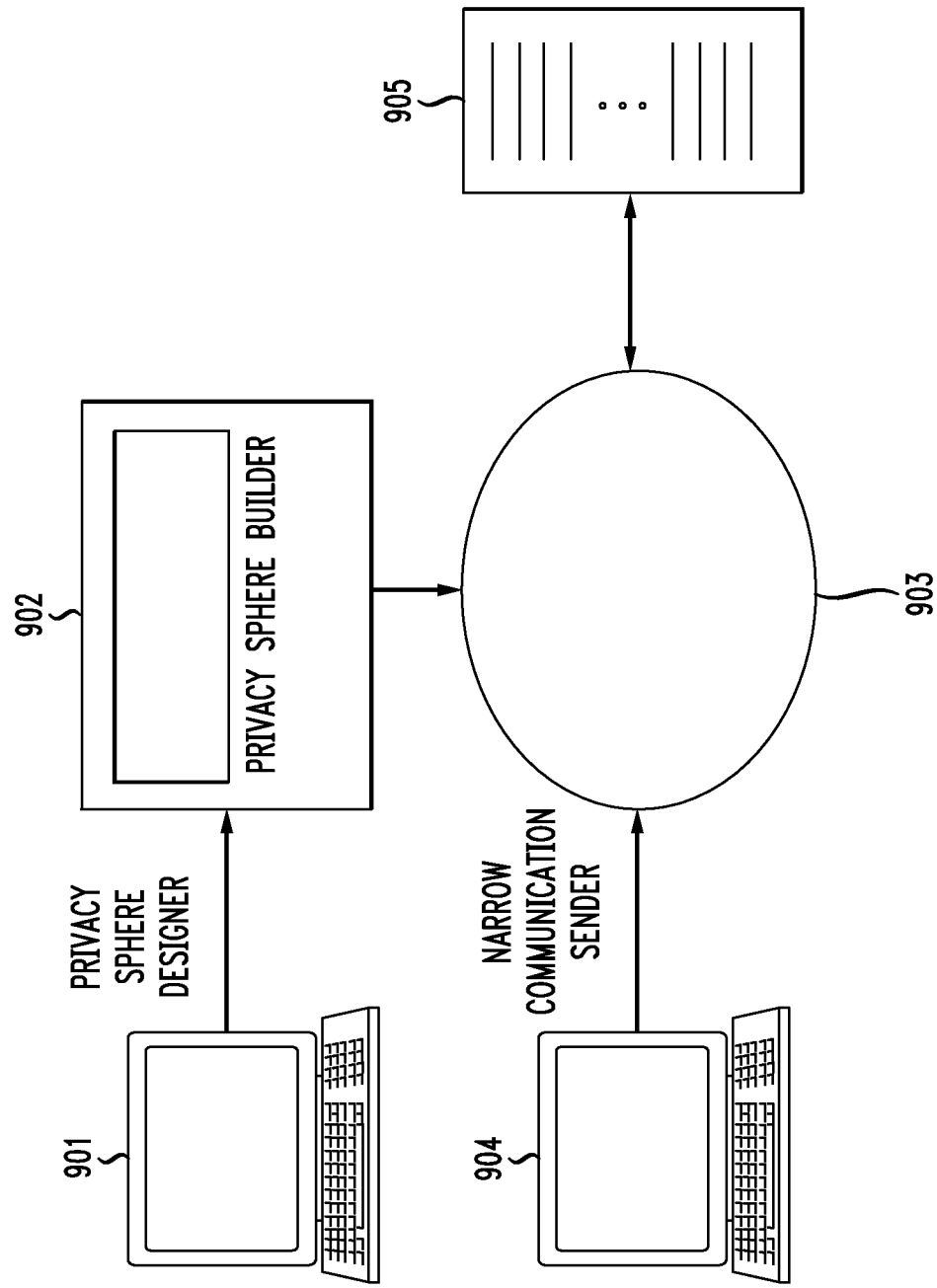
FIG. 9 illustrates a system in which the privacy sphere is generated by a third-party, and used by a narrowcast communication sender to narrowcast a communication to a narrowcast communication recipient according to an embodiment of the present disclosure.

FIG. 9 illustrates an embodiment of the present disclosure in which a privacy sphere 903 is generated by a third party such as a privacy sphere designer 901 instead of the narrowcast communication sender 904 as was described in FIG. 1. The components described in FIG. 9 are generally similar in functionality to the components described in FIG. 1 and FIG. 5. In an embodiment in which a privacy sphere designer 901 designs a privacy sphere 903 for use by a narrowcast communication sender 904, the privacy sphere designer 901 specifies a set of attributes for use in generating a privacy sphere 903. The privacy sphere designer 901 interacts with a Privacy Sphere Builder 902 to generate a set of rules and attributes that make up the Privacy Sphere 903. The narrowcast communication sender 904 references the privacy sphere 903 generated by the privacy sphere builder 902 to be used in combination with a set of objects 905 in generating a narrowcast communication.

In some embodiments, a narrowcast communications sender 904 will use a Privacy Sphere 903 generated by a third party privacy sphere designer 901 to generate a recipient list. In such instances a narrowcast communication sender 904 may refer to a set of objects 905 that the narrowcast communication sender 904 has selected themselves, or the narrowcast communication sender 904 may refer to a set of objects 905 specified by the privacy sphere builder.

Figure 10:
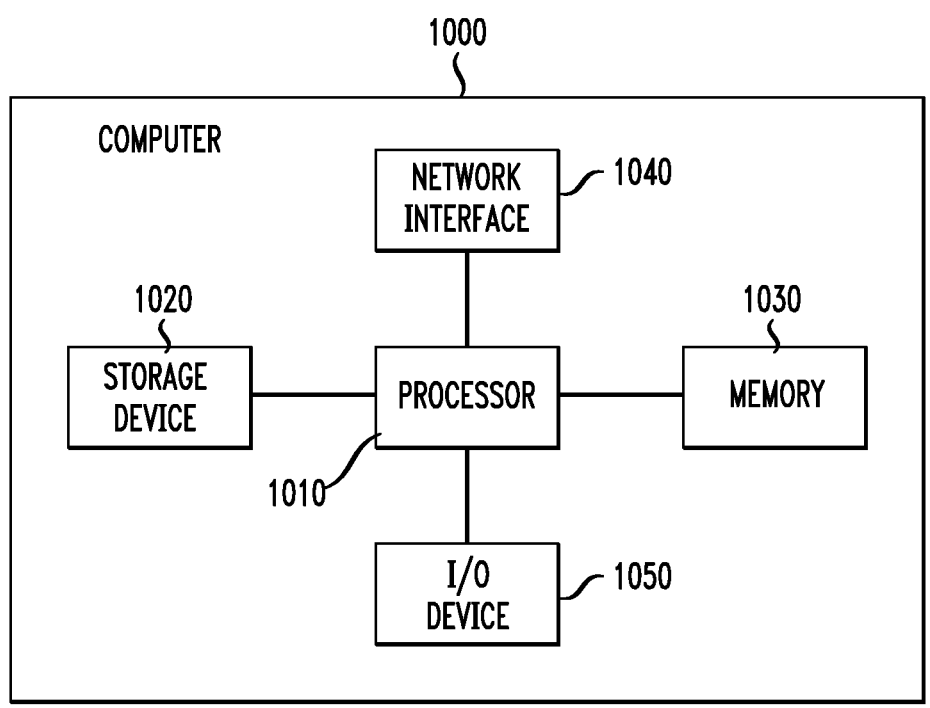
FIG. 10 is a high-level block diagram of a computer according to an embodiment of the present disclosure.

The above-described methods for narrowcasting a communication can be implemented on one or more computers (e.g., an individual computer, a network of computers, or a cloud computing environment) using well-known computer processors, memory units, storage devices, computer software, and other components. A high-level block diagram of such a computer is illustrated in FIG. 10. Computer 1000 contains a processor 1010, which controls the overall operation of the computer 1000 by executing computer program instructions, which define such operations. The computer program instructions may be stored in a storage device 1020, or other computer readable medium (e.g., magnetic disk, CD ROM, etc.), and loaded into memory 1030 when execution of the computer program instructions is desired. Thus, the method steps of FIG. 1 can be defined by the computer program instructions stored in the memory 1030 and/or storage 1020 and controlled by the processor 1010 executing the computer program instructions. For example, the computer program instructions can be implemented as computer executable code programmed by one skilled in the art to perform an algorithm defined by the method steps of FIG. 2. Accordingly, by executing the computer program instructions, the processor 1010 executes an algorithm defined by the method steps of FIG. 2. The computer 1000 also includes one or more network interfaces 1040 for communicating with other devices via a network. The computer 1000 also includes input/output devices 1050 that enable user interaction with the computer 1000 (e.g., display, keyboard, mouse, speakers, buttons, etc.) One skilled in the art will recognize that an implementation of an actual computer could contain other components as well, and that FIG. 4 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention. The various functional modules that are shown are for illustrative purposes only, and may be combined, rearranged and/or otherwise modified.

The invention claimed is:

1. A method of sending an electronic communication to a plurality of message recipients, the method comprising:
receiving, at a processor, the electronic communication;
receiving a privacy sphere comprising a compound attribute including one of a geographic information attribute, an interest information attribute and a temporal information attribute, wherein the privacy sphere is received from a first source different from a second source of the electronic communication;
determining the plurality of message recipients by comparing the privacy sphere to a set of objects, the set of objects comprising a network address and meta-data relating to a potential message recipient including one of geographic information, interest information and temporal information, wherein comparing comprises translating one of the meta-data and the attributes of the compound attribute and comparing the compound attribute to the meta-data; and
transmitting the electronic communication to the plurality of message recipients, wherein the electronic communication comprises instructions operable to delete the electronic communication sent to one of the plurality of message recipients if one of a set of objects associated with the one of the plurality of message recipients changes so that the one of the plurality of message recipients who was initially eligible to receive the electronic communication is no longer eligible to receive the electronic communication.

2. The method of claim 1 further comprising:
deleting the electronic communication based on the compound attribute.

3. The method of claim 1 further comprising:
deleting a portion of the electronic communication based on the compound attribute.

4. The method of claim 1 further comprising:
deleting a portion of the electronic communication and transmitting a second electronic communication based on the compound attribute.

5. An apparatus to send an electronic communication to a plurality of message recipients, the apparatus comprising:
a processor; and
a memory to store computer program instructions, the computer program instructions when executed on the processor cause the processor to perform operations comprising:
receiving the electronic communication;
receiving a privacy sphere comprising a compound attribute including one of a geographic information attribute, an interest information attribute and a temporal information attribute, wherein the privacy sphere is received from a first source different from a second source of the electronic communication;
determining the plurality of message recipients by comparing the privacy sphere to a set of objects, the set of objects comprising a network address and meta-data relating to a potential message recipient including one of geographic information, interest information and temporal information, wherein comparing comprises translating one of the meta-data and the attributes of the compound attribute and comparing the compound attribute to the meta-data; and
transmitting the electronic communication to the plurality of message recipients, wherein the electronic communication comprises instructions operable to delete the electronic communication sent to one of the plurality of message recipients if one of a set of objects associated with the one of the plurality of message recipients changes so that the one of the plurality of message recipients who was initially eligible to receive the electronic communication is no longer eligible to receive the electronic communication.

6. The apparatus of claim 5, the operations further comprising:
deleting the electronic communication based on the compound attribute.

7. The apparatus of claim 5, the operations further comprising:
deleting a portion of the electronic communication based on the compound attribute.

8. The apparatus of claim 5, the operations further comprising:
deleting a portion of the electronic communication and transmitting a second electronic communication based on the compound attribute.

9. A non-transitory computer readable medium storing computer program instructions, which, when executed on a processor, cause the processor to perform operations comprising:
receiving the electronic communication;
receiving a privacy sphere comprising a compound attribute including one of a geographic information attribute, an interest information attribute and a temporal information attribute, wherein the privacy sphere is received from a first source different from a second source of the electronic communication;
determining the plurality of message recipients by comparing the privacy sphere to a set of objects, the set of objects comprising a network address and meta-data relating to a potential message recipient including one of geographic information, interest information and temporal information, wherein comparing comprises translating one of the meta-data and the attributes of the compound attribute and comparing the compound attribute to the meta-data;
assembling a recipient list based on the comparing;
defining a message restriction set based on the privacy sphere;
preparing the electronic communication comprising the message restriction; and
transmitting the electronic communication to the plurality of message recipients,
wherein the preparing comprising preparing instructions operable to delete the electronic communication sent to one of the plurality of message recipients if one of a set of objects associated with the one of the plurality of message recipients changes so that the one of the plurality of message recipients who was initially eligible to receive the electronic communication is no longer eligible to receive the electronic communication.

10. The non-transitory computer readable medium of claim 9, the operations further comprising:
deleting a portion of the electronic communication based on the compound attribute.

* * * * *